Sept. 9, 1969     R. BROMBERG ET AL     3,465,813
METHOD OF AND MEANS FOR INCREASING THE HEAT
TRANSFER CAPABILITY OF A HEAT PIPE
Filed July 26, 1967
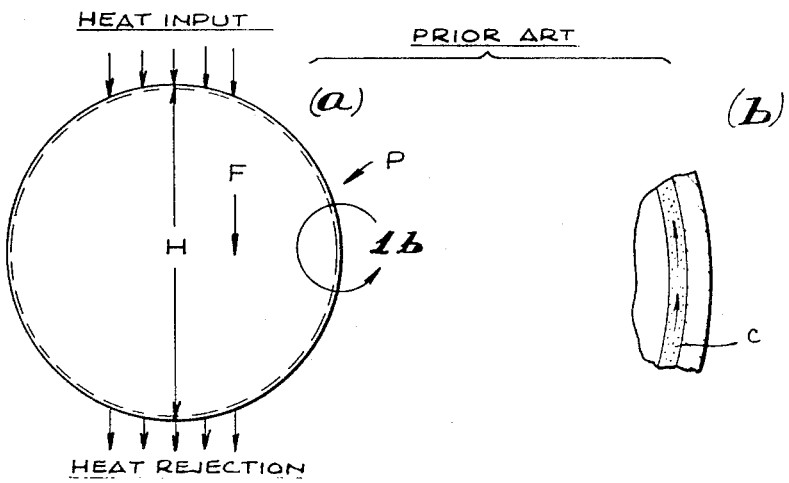
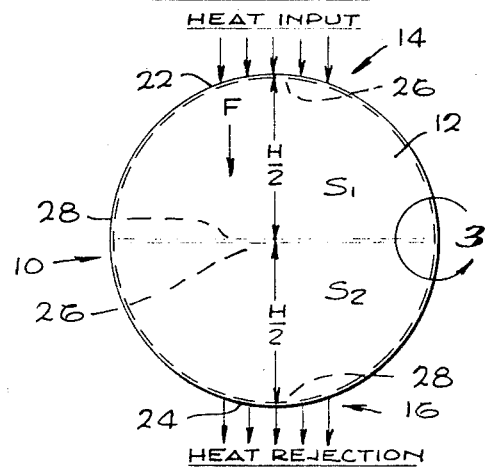
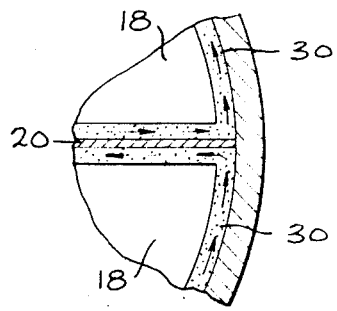
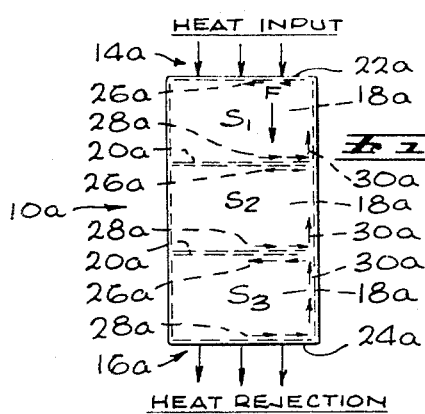
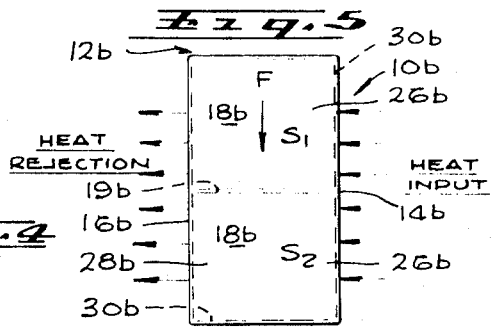
INVENTORS
FRED E. ROMIE
ROBERT BROMBERG
BY
Donald R. Nykanen
ATTORNEY

United States Patent Office 3,465,813
Patented Sept. 9, 1969

3,465,813
METHOD OF AND MEANS FOR INCREASING THE HEAT TRANSFER CAPABILITY OF A HEAT PIPE
Robert Bromberg and Fred E. Romie, Palos Verdes Estates, Calif., assignors to TRW Inc., Redondo Beach, Calif., a corporation of Ohio
Filed July 26, 1967, Ser. No. 656,126
Int. Cl. F28d 15/00; F25d 15/00
U.S. Cl. 165—1
3 Claims

ABSTRACT OF THE DISCLOSURE

A multi-stage capillary heat pipe for operation in a body force field, the pipe having a number of separate heat transfer stages arranged in such a way that the effective height of the capillary liquid column within each stage in the direction of the body force vector is but a fraction of the overall length of the heat pipe, the hydrostatic resistance to capillary liquid flow produced by the force is decreased, and the heat transfer capability of the heat pipe is increased. A method of heat transfer involving the multi-stage heat pipe.

BACKGROUND OF THE INVENTION

Field of the invention.—This invention relates to heat transfer devices or heat exchangers of the class which are commonly referred to as heat pipes. The invention relates more particularly to a method of and means for increasing the heat transfer capability of a capillary flow heat pipe wherein the capillary liquid is subjected to a body force opposing capillary liquid flow.

Prior art.—Generally speaking, a heat pipe is a hermetic heat transfer device or heat exchanger having heat input and rejection regions and containing a heat transfer fluid in both its liquid phase and vapor phase. During operation of the heat pipe, the fluid undergoes a closed heat transfer cycle involving vaporization of the fluid by heat absorption through the heat input region of the pipe, flow of the fluid vapor to the heat rejection region of the pipe, condensation of the vapor by rejection of its latent heat of vaporization through the heat rejection region of the pipe, and return of the liquid condensate to the heat input region of the pipe to repeat the cycle. The prior art heat pipes are characterized by a single heat transfer stage and by either body force or capillary force induced flow of the liquid heat transfer fluid from the heat rejection region to the heat input region of the pipe. Patent No. 3,154,139 discloses a typical body force flow heat pipe. Patent No. 3,229,759 discloses a typical capillary flow heat pipe.

The existing body force flow heat pipes are deficient for the reason that they are operative only in an environment or force field which produces on the liquid heat transfer fluid the requisite body force for moving the fluid from the heat rejection region to the heat input region of the heat pipe. This body force may be a gravitational force or an acceleration force. Moreover, heat pipes of this kind must be properly oriented relative to the vector of the body force to render the latter effect to move the liquid fluid in the proper direction through the heat pipe. The existing single-stage capillary flow heat pipes, while devoid of the above deficiency, are subject to the disadvantage that the effective height or length of the capillary liquid column in the direction of a body force active on the liquid is equal to the overall length of the pipe parallel to the body force vector. As a consequence, the hydrostatic pressure differential opposing capillary liquid flow in the heat pipe, when the liquid is subjected to a body force, in opposition to capillary flow, may be relatively large in comparison to the capillary driving pressure for moving the liquid. Obviously, the difference between the capillary driving pressure and the hydrostatic pressure differential represents the net effective driving pressure which is available to supply the frictional pressure loss occasioned by liquid flow through the capillary structure. Since the heat transfer capability of a heat pipe is a direct function of the rate of capillary liquid flow and this flow rate, in turn, is a direct function of the net available driving pressure on the capillary liquid, the heat transfer capability of a single stage heat pipe may be quite low.

SUMMARY OF THE INVENTION

The present invention provides a capillary flow heat pipe which is divided into a number of separate heat transfer stages arranged between the heat input and rejection sections of the pipe in such a way that the effective height or length of the capillary liquid column in each stage, parallel to the vector of the body force active on the liquid, is but a fraction of the overall length of the pipe. Accordingly, the effective hydrostatic pressure differential which opposes capillary liquid flow through the heat pipe when the capillary liquid is subjected to a body force is decreased and the heat transfer capability of the heat pipe is increased.

BRIEF DESCRIPTION OF THE DRAWINGS

In the drawings:
FIG. 1a is an elevational view of a typical prior art heat pipe;
FIG. 1b is an enlarged fragmentary section of the area encircled by the arrow 1b in FIG. 1a;
FIG. 2 is an elevational view of a two-stage capillary heat pipe according to the invention;
FIG. 3 is an enlarged fragmentary section of the area encircled by the arrow 3 in FIG. 1;
FIG. 4 is an elevational view of a three-stage capillary heat pipe according to the invention; and
FIG. 5 is an elevational view of a modified two-stage capillary heat pipe according to the invention.

DESCRIPTION OF THE PREFERRED EMBODIMENTS

According to one of its embodiments, the invention provides a multi-stage heat pipe, represented in FIGS. 2 and 3 by the heat pipe 10, having a hermetic casing 12 with a heat input section 14 and a heat rejection section 16. The casing contains a number of separate hermetic heat transfer chambers 18 arranged in series between the heat input and rejection sections. The adjacent chambers are separated by an intervening heat transfer wall 20. The heat input section 14 of the pipe casing 12 has a heat transfer wall 22 to which heat from a heat source is to be transferred. The heat rejection section 16 has a heat transfer wall 24 from which heat is rejected. Each chamber 18 is thus bounded by a first heat transfer wall adjacent the heat input section of the casing and a second heat transfer wall adjacent the heat rejection section of the casing. As will appear presently, during operation of the heat pipe, heat flows from the heat source, through the heat transfer chambers 18 in succession, to a heat sink in such a way that heat flow occurs from one chamber to the following chamber through the intervening heat transfer wall 20. The region 26 of each heat pipe chamber 18 adjacent the heat input section 14 of the heat pipe constitutes, and is hereinafter referred to as, an evaporator region. The opposite region 28 of each chamber constitutes, and is hereinafter referred to as a condenser region.

Within each heat pipe chamber 18 are capillary means 30 which extend between the evaporator and condenser regions 26, 28 of the respective chamber in heat transfer relation to the casing. The capillary means within each chamber have portions disposed in heat transfer relation to the heat transfer wall 20, 22 or 20, 24 of the respective chamber. The adjacent portions of the capillary means within adjacent chambers are disposed in heat transfer relation through the intervening heat transfer wall 20.

As will become evident from the ensuing description, a multi-stage heat pipe according to the invention may embody any number of separate heat pipe stages. The heat pipe 10 illustrated in FIGS. 2 and 3, for example, is a two-stage heat pipe having two heat transfer stages $S_1$ and $S_2$ arranged in series between the heat input section 14 and heat rejection section 16 of the pipe. In this case, the heat pipe has a pair of separate heat pipe chambers 18 and a single intervening heat transfer wall 20 separating the chambers. One of these chambers is bounded at one side by the heat input wall 22 and at the opposite side by the intervening heat transfer wall 20. The other chamber is bounded at one side by the intervening heat transfer wall 20 and at the opposite side by the heat rejection wall 24. The modified heat pipe $10a$ illustrated in FIG. 3 is a three-stage heat pipe having three heat transfer stages $S_1$, $S_2$ and $S_3$ arranged in series between the heat input section $14a$ and the heat rejection section $16a$ of the pipe. In this case, the heat pipe has three separate heat transfer chambers $18a$ and two intervening heat transfer walls $20a$ separating the respective adjacent chambers. One outer chamber is bounded by the heat input wall $22a$ and the adjacent intervening heat transfer wall $20a$. The center chamber is bounded by the two heat transfer walls $20a$. The remaining outer chamber is bounded by the heat rejection wall $24a$ and the adjacent heat transfer wall $20a$. Each chamber $18a$ of the heat pipe $10a$ contains capillary means $30a$ which extend between the evaporator and the condenser regions $26a$, $28a$ of the respective chamber and have portions disposed in heat transfer relation to its respective heat transfer walls.

The capillary means 30, $30a$ of the present heat pipes may comprise various capillary materials. By way of example, the capillary material may consist of a thin sheet of fine mesh or so-called micronic wire screen, wick material, or the like. The capillary material is disposed in direct contact with the inner surfaces of the heat pipe chambers and may be secured to these chamber surfaces in any convenient way which provides minimum thermal resistance between the chamber walls and the capillary material. According to the preferred practice of the invention, the capillary material covers the entire inner surfaces of the chambers, as illustrated in the drawings.

The heat pipes of the invention are conditioned for operation by filling their chambers 18, $18a$ with a quantity of liquid heat transfer fluid, such as water, or a liquid metal, equal to or slightly in excess of that required to saturate the capillary layer 30, $30a$ in each chamber. The chambers are then evacuated until all of the air is removed, after which the chambers are sealed.

During operation of the heat pipes, the liquid heat transfer fluid contained by the capillary layer 30, $30a$ within the evaporator region 26, $26a$ of the first heat pipe stage $S_1$ is vaporized by heat absorption through the adjacent heat input wall 22, $22a$ of the pipes. The resulting fluid vapor passes through the central flow space in the corresponding heat pipe chamber 18, $18a$ to the condenser region 28, $28a$ of the first stage. Heat transfer then occurs from the vapor, through the adjacent intervening heat transfer wall 20, $20a$ to the liquid heat transfer fluid contained by the capillary layer in the evaporator region of the following heat pipe stage $S_2$. This results in condensation of the fluid vapor in the condenser region of the first stage and vaporization of the liquid heat transfer fluid in the evaporator region of the second stage. The liquid condensate in the first stage of the heat pipes is absorbed by the capillary layer for return flow through the layer to the evaporator region of the first stage to repeat the cycle. This closed thermodynamic cycle is repeated in each stage of the heat pipes, the fluid vapor in the final stage being condensed by heat transfer through the heat rejection wall 24, $24a$ of the pipes. Thus, during operation of the present multi-stage heat pipes, heat flow through the pipes occurs through the several heat transfer stages in succession and from the fluid vapor in one stage to the liquid heat transfer fluid in the following stage, through the intervening heat transfer wall 20, $20a$.

The vapor pressure differential existing between the evaporator region 26, $26a$ and the condenser region 28, $28a$ of each stage of the present heat pipes furnishes the driving force for inducing flow of the fluid vapor from the evaporator region to the condenser region. The capillary force existing in the capillary layer 30, $30a$ of each stage furnishes the driving pressure for returning the liquid heat transfer fluid, or condensate, from the condenser region to the evaporator region of the respective stage. Such capillary action is well understood in the art, and therefore, need not be treated in detail here. Suffice it to say that any capillary layer exhibits a maximum driving pressure which can be represented by the quotient of the liquid surface tension and a linear dimension characteristic of the effective pore size of the capillary layer, i.e., a line ar dimension which may be on the order of one fourth the pore diameter. In the event the heat pipe operates in an environment which creates a body force on, and a resulting hydrostatic pressure differential in, the liquid heat transfer fluid in opposition to the capillary driving pressure, the net driving pressure available to supply the frictional pressure loss occasioned by flow of the liquid through the capillary structure is decreased correspondingly. The illustrated heat pipes of the invention, for example, are assumed to be operating in a force field or environment which produces on the liquid heat transfer fluid in the pipes a body force in the direction of the force vectors F and hence in opposition to capillary flow of the liquid in each heat transfer stage. The body force may be gravitational force, an acceleration force, an electromagnetic force, or an electrostatic force, for example. Since the hydrostatic pressure differential created by such a body force effectively reduces the capillary driving pressure available for moving the liquid flow through the capillary layer, it also reduces the rate of capillary flow of the liquid and hence the heat transfer capability of the heat pipe. It is thus desirable to decrease the hydrostatic pressure differential in the capillary liquid in order to increase the heat transfer capability of the heat pipe.

According to the present invention, the hydrostatic pressure differential in the liquid heat transfer fluid within the heat pipes created by the body force F is reduced by the illustrated multi-stage configuration of the heat pipes. This multi-stage configuration reduces the effective height or length, parallel to the body force vector, of the capillary liquid column within each heat pipe stage to a fraction of the overall length of the pipe in the direction of the body force F. The reduction in the effective height of each capillary liquid column in the heat pipe, relative to the overall length of the heat pipe, obviously results in a corresponding reduction in the hydrostatic pressure differential in each column. In this regard, attention is directed to FIGS. 1a and 1b which illustrate a conventional single-stage heat pipe P wherein the liquid heat transfer liquid in the capillary layer C is subjected to a body force F. Obviously, the hydrostatic pressure differential created by the force in opposition to the capillary driving pressure is proportional to the overall length H of the heat pipe in the direction of the body force vector. In the present heat pipes 10 and 10a of FIGS. 2 and 4, on the other hand, the hydrostatic pressure differences created by the same body force are proportional, respectively, to one half and one third the overall heat pipe length H. It is now evident, therefore, that the present multi-stage heat pipe configuration increases the net driving pressure which is available for moving the liquid heat transfer fluid through each stage of the heat pipe, from its condensor region to its evaporator region, and hence the heat transfer capability of the pipe.

The increased heat transfer capability achieved by the present multi-stage heat pipe configuration is obtained at the expense of the thermal resistance introduced by the intervening heat transfer wall or walls 20, 20a embodied in the pipe. However, this added thermal resistance may be reduced by utilizing relatively thin intervening heat transfer walls having a relatively high coefficient of thermal conduction. According to the preferred practice of the invention, for example, the intervening heat transfer walls of the heat pipe may comprise relatively thin membranes. The use of such relatively thin membranes is permitted by virture of the fact that the vapor pressures existing in the several heat pipe chambers 18, 18a will be substantially balanced. While the invention has been disclosed in connection with a two-stage and a three-stage heat pipe, it is evident that a heat pipe according to the invention may be equipped with any desired number of stages appropriate to each particular heat pipe application. Moreover, multi-stage heat pipes according to the invention may be provided with any desired shape, depending upon their particular applications.

Reference is now made to FIG. 5, which illustrates a modified multi-stage heat pipe 10b according to the invention. The heat pipe has a hermetic casing 12b with heat input and rejection sections 14b, 16b and intervening heat transfer chambers 18b, separated by a wall or membrane 19b. Each chamber defines evaporator and condenser regions 26b, and 28b adjacent the heat input and rejection sections, respectively, and a communicating vapor flow space between the sections. Within and extended between the evaporator and condenser regions of each chamber are capillary means 30b. The modified heat pipe 10b, like the earlier heat pipes of the invention, is conditioned for operation by filling its heat transfer chambers 18b with a quantity of liquid heat transfer fluid at least substantially equal to that required to saturate the capillary means or layers 30b, evacuating all of the air from the chambers, and then sealing the chambers.

During operation of the modified heat pipe 10b, heat flow to and from the pipe occurs through its heat input and rejection sections 14b, 16b in such a way that the heat transfer fluid within each heat transfer chamber 18b of the pipe undergoes the same closed thermodynamic cycle explained previously in connection with the earlier heat pipes of the invention. However, the operation of the modified heat pipe differs in one significant respect from the operation of the earlier heat pipes. Thus, in the earlier heat pipes, heat flow through the pipes occurs through their heat transfer chambers in series and from one chamber to the following chamber through the intervening heat transfer wall or membrane. In the modified heat pipe 10b, on the other hand, heat flow through the pipe occurs thru the heat transfer chamber 18b in parallel. That is to say, in operation of the modified heat pipe, the latter is so located relative to a heat source, and the interior membrane (or membranes) 19b is so positioned within the heat pipe that heat from the heat source is distributed over the internal heat pipe surfaces, and the heat flow into each heat transfer chamber through the heat input section of the pipe equals the heat outflow from the respective chamber through the heat rejection section of the pipe. Accordingly, the outer surface of the heat pipe is isothermal and no heat flow occurs between the heat transfer chambers through the intervening membrane (or membranes) 19b. The modified heat pipe is designed to operate in an environment which produces on the liquid heat transfer fluid within the pipe a body force F whose vector extends transversely to the direction of the heat flow through the pipe. In this case, as in the earlier embodiments of the invention, the multi-stage configuration of the modified heat pipe reduces the effective height or length of the capillary liquid columns within each heat pipe stage in the direction of the body force vector, i.e., the capillary liquid columns which extend along the inner surfaces of the heat input and rejection sections 14b, 16b of the pipe and hence the hydrostatic liquid pressure difference created by the body force. The heat transfer capability of the heat pipe is hereby increased as before. Obviously, the modified heat pipe 10b, like the earlier heat pipes invention, may comprise any number of separate heat pipe stages.

While the invention has been disclosed in what is presently conceived to be its preferred and most practical embodiments, it will be understood that modifications of the invention are possible within the spirit and scope of the following claims.

The embodiment of the invention in which an exclusive property or privilege is claimed are defined as follows:

1. The method of transferring heat from a heat source to a heat sink within a force field which acts on fluid situated in the field to produce on such fluid a body force in the direction of a force field vector, which method comprises the steps of:

arranging between said heat source and heat sink a pair of separate capillary heat pipe stages each having an evaporator region and a condenser region in such a way that said stages are spaced in the direction of said force field vector and heat flow from said heat source to said heat sink occurs through both of said stages; and inducing capillary flow of a liquid heat transfer fluid from the condenser region to the evaporator region of each stage in such a way that the liquid fluid in each stage is vaporized within the evaporator region of the respective stage by heat from said source, the fluid vapor is condensed in the condenser region of the respective stage by heat rejection to said heat sink, and the liquid condensate is returned by capillary flow against the action of said force field to the evaporator region of the respective stage.

2. The heat transfer method according to claim 1, wherein:

said heat pipe stages are arranged in series between said heat source and heat sink in such a way that heat flow from said source to said sink occurs from one stage to the other stage by heat transfer from the fluid vapor in the condenser region of said one stage to the liquid heat transfer fluid in the evaporator region of said other stage.

3. The method of transferring heat from a heat source to a heat sink within a force field which acts on fluid situated in the field to produce on such fluid a body force in the direction of a force field vector, which method comprises the steps of:

arranging in parallel between said heat source and heat sink a pair of separate capillary heat pipe stages each having an evaporator region disposed in heat transfer relation to said heat source and a condenser region disposed in heat transfer relation to said heat sink in such a way that said stages are spaced in the direction of said force field vector and heat flow from said heat source to said heat sink occurs through said stages in parallel; and inducing capillary flow of a liquid heat transfer fluid from the condenser region to the evaporator region of each stage in such a way that the liquid fluid in each stage is vaporized within the evaporator region of the respective stage by heat from said source, the fluid vapor is condensed in the condenser region of the respective stage by heat rejection to said heat sink, and the liquid condensate is returned by capillary flow against the action of said force field to the evaporator region of the respective stage.

References Cited

UNITED STATES PATENTS

| | | | |
|---|---|---|---|
| 1,754,314 | 4/1930 | Gay | 174—15 X |
| 1,786,285 | 12/1930 | Bissell | 123—41.16 |
| 3,018,087 | 1/1962 | Steele | 165—105 |
| 3,229,759 | 1/1966 | Grover | 165—105 |

FOREIGN PATENTS 633,242  12/1961  Canada.

OTHER REFERENCES

Bohdansky, J., et al.: "Use of a New Heat Removal System in Space Thermionic Power Supplies," 1965, p. 8, Euratom EUR2229.e.

ROBERT A. O'LEARY, Primary Examiner

A. W. DAVIS, Assistant Examiner